United States Patent
Lu et al.

(10) Patent No.: US 7,373,033 B2
(45) Date of Patent: May 13, 2008

(54) CHIP-TO-CHIP OPTICAL INTERCONNECT

(75) Inventors: Daoqiang Lu, Chandler, AZ (US); Jiamiao Tang, Shanghai (CN); Jiangqi He, Gilbert, AZ (US); Edward A. Zarbock, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/452,820

(22) Filed: Jun. 13, 2006

(65) Prior Publication Data

US 2007/0297713 A1 Dec. 27, 2007

(51) Int. Cl.
*G02B 6/12* (2006.01)
*H01L 31/0232* (2006.01)

(52) U.S. Cl. .................... 385/14; 385/49; 385/92; 257/432; 257/779

(58) Field of Classification Search ............ 385/14, 385/49–51, 88–94; 257/432, 779
See application file for complete search history.

(56) References Cited

U.S. PATENT DOCUMENTS

| | | |
|---|---|---|
| 4,943,136 A | 7/1990 | Popoff |
| 4,944,568 A | 7/1990 | Danbach et al. |
| 5,276,745 A | 1/1994 | Revelli, Jr. |
| 5,359,686 A | 10/1994 | Galloway et al. |
| 6,693,736 B1 | 2/2004 | Yoshimura et al. |
| 6,792,179 B2 | 9/2004 | Lu et al. |
| 6,834,133 B1 | 12/2004 | Towle et al. |
| 6,982,996 B1 | 1/2006 | Putnam et al. |
| 7,005,719 B2 * | 2/2006 | Masumoto ............... 257/432 |
| 7,049,704 B2 * | 5/2006 | Chakravorty et al. ...... 257/778 |
| 2002/0196997 A1* | 12/2002 | Chakravorty et al. ........ 385/14 |
| 2003/0015720 A1 | 1/2003 | Lian et al. |
| 2004/0126058 A1 | 7/2004 | Lu et al. |
| 2004/0126064 A1 | 7/2004 | Vandentop et al. |
| 2004/0165812 A1 | 8/2004 | Blauvelt et al. |
| 2004/0190831 A1 | 9/2004 | Lu et al. |
| 2005/0036728 A1 | 2/2005 | Braunisch |
| 2005/0100264 A1* | 5/2005 | Kim et al. .................. 385/14 |
| 2005/0163459 A1 | 7/2005 | Deliwala |
| 2005/0207464 A1 | 9/2005 | Blauvelt et al. |
| 2005/0213889 A1 | 9/2005 | Blauvelt et al. |
| 2006/0051021 A1 | 3/2006 | Braunisch et al. |

(Continued)

OTHER PUBLICATIONS

Kuo, Hung-Fei et al., "InP/InGaAsP MQW Thin Film Edge Emitting Lasers for Embedded Waveguide Chip to Chip Optical Interconnections," Lasers and Electro-Optics Society, 2003. The 16th Annual Meeting of the IEEE, vol. 1, Oct. 27-28, 2003, pp. 63-64.
Lo, Jeffery C.C. et al., "Modified Passive Alignment of Optical Fibers with Low Viscosity Epoxy Flow Running in V-grooves," 2004 Electronic Components and Technology Conference. ECTC '04. Proceedings, vol. 1, Jun. 1-4, 2004, pp. 830-834.

(Continued)

*Primary Examiner*—Hemang Sanghavi
(74) *Attorney, Agent, or Firm*—Blakely, Sokoloff, Taylor & Zafman LLP

(57) ABSTRACT

A chip-to-chip optical interconnect includes a substrate, an optoelectronic die, and a waveguide structure. The substrate includes an optical via passing through the substrate. The optoelectronic die is disposed on the substrate and aligned to optically communicate through the optical via. A waveguide structure is positioned proximate to the substrate and aligned with the optical via to communicate optical signals with the optoelectronic die through the optical via.

19 Claims, 7 Drawing Sheets

U.S. PATENT DOCUMENTS

2006/0067606 A1  3/2006  Towle et al.
2006/0067609 A1  3/2006  Lu et al.
2006/0067624 A1  3/2006  Towle et al.
2006/0088254 A1  4/2006  Mohammed

OTHER PUBLICATIONS

Mohammed, E. M. et al., "Optical I/O technology for digital VLSI," Proceedings of SPIE, vol. 5358, (2004), pp. 60-70.

U.S. Appl. No. 10/664,475, filed Sep. 17, 2003.

U.S. Appl. No. 11/096,504, filed Mar. 29, 2005.

U.S. Appl. No. 11/234,930, filed Sep. 26, 2005.

U.S. Appl. No. 11/313,534, filed Dec. 21, 2005.

U.S. Appl. No. 11/124,033, filed May 6, 2005.

Leheny, R. F., "Optoelectronic Integration: A Technology for Future Telecommunication Systems", *IEEE Circuits and Devices Magazine*, vol. 5, No. 3, May 1, 1989, pp. 38-41.

Hayashi, Izuo, "Future Technology and Market for Optoelectronics", *Lasers and Electro-Optics Society Annual Meeting Conference Proceedings*, vol. 1, Conf. 2, Oct. 17, 1989, pp. 1-5.

Wada, Osamu, "III-V Semiconductor Integrated Optoelectronoics for Optical Computing", *SPIE*, vol. 1362, Physical Concepts of Materials for Novel Optoelectronic Device Applications II: Device Physics and applications, 1990, pp. 598-607.

Takeuchi, Hiroaki et al., "Monolithic Integrated Optical Circuit for Coherent Detection", *Electronics and Communications in Japan, Part II: Electronics*, vol. 74, No. 1, Jan. 1991, pp. 38-45.

PCT/US2006/037126, PCT International Search Report and Written Opinion, Jan. 22, 2007.

U.S. Appl. No. 11/234,930 (filed Sep. 26, 2005), Office Action mailed Jan. 8, 2007.

Lu, Daoqiang et al., "Optical Package," U.S. Appl. No. 10/954,903, filed Sep. 30, 2004.

Schares, L., et al., "Terabus - A Weaveguide-Based Parallel Optical Interconnect for Tb/s-Class On-Board Data Transfers in Computer Systems," *ECOC 2005 Proceedings* vol. 3, Paper We 1.5.5.

Kash, J.A., et al., "Terabus: a Chip-to-Chip Parallel Optical Interconnect," *IEEE*, pp. 363-364, 2005.

* cited by examiner

CHIP-TO-CHIP OPTICAL INTERCONNECT

TECHNICAL FIELD

This disclosure relates generally to optical interconnects, and in particular but not exclusively, relates to chip-to-chip optical interconnects.

BACKGROUND INFORMATION

As the power of processing devices exponentially increases, high bandwidth communication links interconnecting these processing devices are increasingly important. Optical media or carriers are capable of providing such high bandwidth communication links. To utilize optical carriers, optical-electrical interfaces are needed to interface the optical realm of the carrier with the electrical realm of the processing devices.

One type of optical-electrical interface uses a waveguide embedded within a substrate having a multi-terminal ("MT") connector to form a make and break connection with an external waveguide. The substrate may support a variety of electrical devices that interface with the embedded waveguide via an optoelectronic die. The optoelectronic die is electrically coupled to the substrate while at the same time carefully positioned to optically align with micro-mirrors integrated into the end of the embedded waveguide. These optical-electrical interfaces are generally manufactured using distinct components, which are fabricated separately, and cumbersomely assembled.

Known optical-electrical interfaces, such as the one described above, use active alignment techniques to obtain the necessary alignment precision. Active alignment entails manually aligning the optoelectronic die with the embedded waveguide while the optical-electrical interface is stimulated and observed with a photodetector or microscope for sufficient alignment. Manual active alignment is labor intensive and does not lend itself well to high volume manufacturing ("HVM").

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a method, apparatus, and system for a chip-to-chip optical interconnect are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
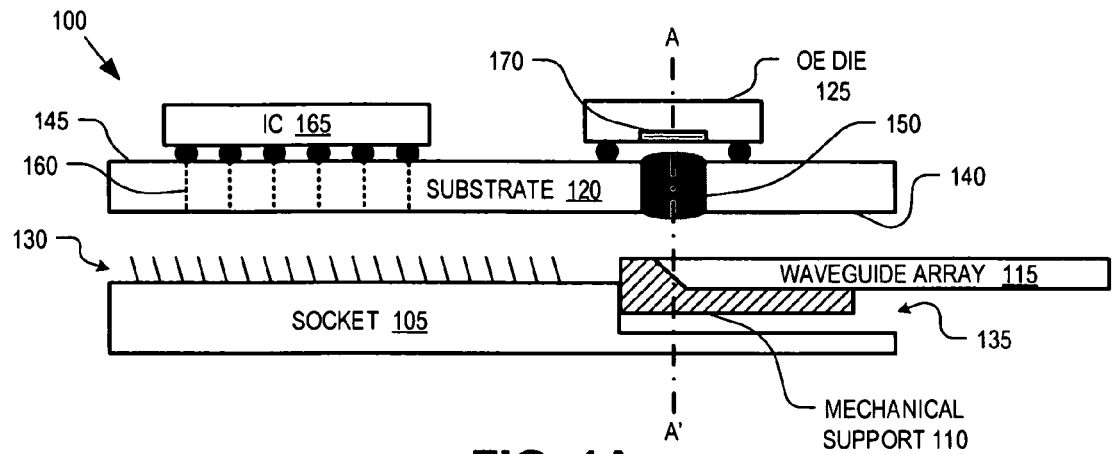
FIG. 1A is a side view illustrating one side of a chip-to-chip optical interconnect, in accordance with an embodiment of the invention.
Figure 1B:
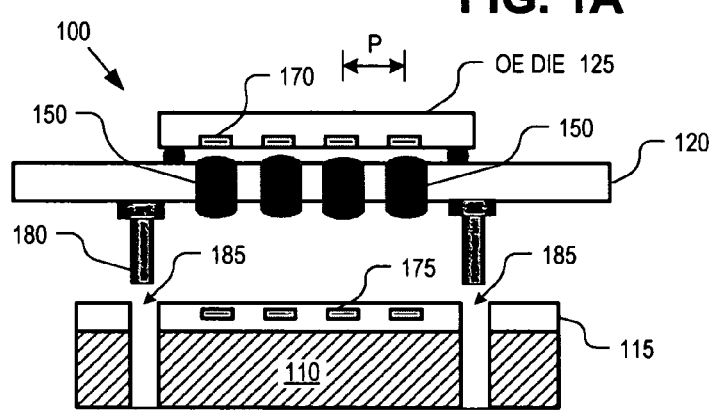
FIG. 1B is a cross-sectional view illustrating one side of a chip-to-chip optical interconnect, in accordance with an embodiment of the invention.
Figure 1C:
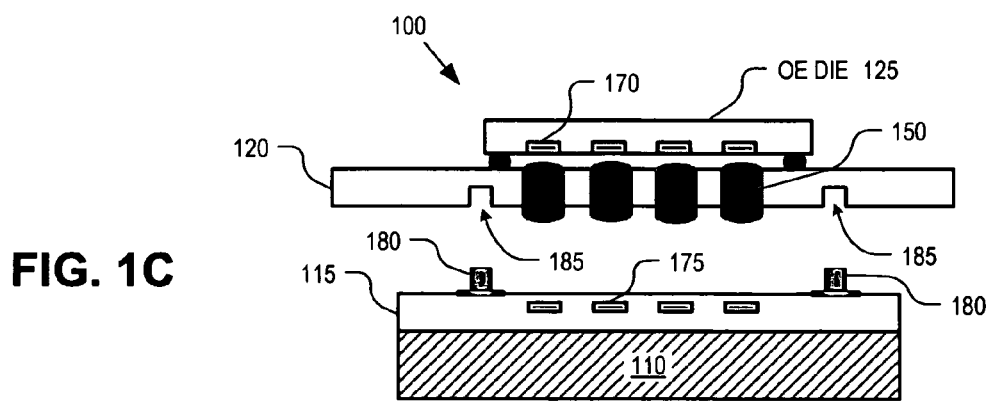
FIG. 1C is a cross-section view illustrating one side of a chip-to-chip optical interconnect, in accordance with an embodiment of the invention.

FIGS. 1A, 1B, and 1C illustrate one terminal end of a chip-to-chip optical interconnect 100, in accordance with an embodiment of the invention. FIG. 1A is a side view of chip-to-chip optical interconnect 100, FIG. 1B is a cross-sectional view along axis A-A' of one embodiment of chip-to-chip optical interconnect 100, while FIG. 1C is a cross-section view along axis A-A' of another embodiment of chip-to-chip optical interconnect 100. It should be appreciated that the figures are not illustrated to scale, but are merely intended for illustration.

The illustrated embodiment of chip-to-chip optical interconnect 100 includes a socket 105, a mechanical support 110, a waveguide array 115, a substrate 120, and an optoelectronic ("OE") die 125. The illustrated embodiment of socket 105 includes an electrical terminal array 130 and a waveguide mounting region 135. The illustrated embodiment of substrate 120 includes a landside 140, a chip side 145, optical through vias ("OTVs") 150, an electrical terminal array 155 (see FIG. 2B), and electrical vias 160. In some cases, only a few instances of a particular element are labeled so as not to crowd the drawings.

One or more chips or integrated circuits ("ICs") may be mounted on chip side 145 of substrate 120. In the illustrated embodiment, two chips are mounted to substrate 120 including OE die 125 and IC 165. OE die 125 is optically coupled to waveguide array 115 through OTVs 150. IC 165 may be electrically connected to OE die 125 via conductor lines or traces routed along chip side 145 of substrate 120 or within interior layers of substrate 120. Substrate 120 may be fabricated of a variety of different rigid materials including organic materials. In one embodiment, substrate 120 is approximately 1 mm thick.

In turn, IC 165 may be electrically coupled to one or more remote ICs via socket 105. In the illustrated embodiment, an electrical terminal array of IC 165 is coupled to a corresponding electrical terminal array (e.g., flip chip solder joint array, etc.) on chip side 145 of substrate 120. The electrical terminal array on chip side 145 of substrate 120 is electrically coupled to electrical terminal array 155 (see FIG. 2B) on landside 140 of substrate 120 through electrical vias 160. When substrate 120 is mated to socket 105, electrical terminal array 155 couples to corresponding electrical terminal array 130, which then forms connections through socket 105 to external chips mounted on the same circuit board as socket 105. In one embodiment, electrical terminal array 155 is a land grid array ("LGA") and electrical terminal array 130 is an array of metal contacts.

OE die 125 includes one or more optoelectronic devices, such as optical detectors (e.g., photodiode) and/or optical sources (e.g., vertical cavity surface emitting lasers ("VCSEL")), each optically aligned with a corresponding OTV 150. Correspondingly, waveguide array 115 may include one or more waveguides 175 each optically aligned with a corresponding OTV 150. In the case of optical detectors, optical signals received from waveguide array 115 through OTVs 150 are converted from the optical realm into the electrical realm within OE die 125 and output to IC 165. In the case of optical sources, electrical signals output from IC 165 maybe converted from the electrical realm to the optical realm within OE die 125 and launched into waveguide array 115 through OTVs 150.

In the illustrated embodiment, chip-to-chip optical interconnect 100 includes alignment structures to passively align OTVs 150 with waveguides 175 of waveguide array 115, when substrate 120 is mated to socket 105. FIG. 1B illustrates an embodiment of chip-to-chip optical interconnect 100 including alignments pins 180 disposed on landside 140 of substrate 120 and alignment holes 185 disposed in waveguide array 115 and mechanical support 110. Upon connecting substrate 120 to socket 105, alignment pins 180 will mate with alignment holes 185 causing OTVs 150 to passively align with waveguides 175. FIG. 1C illustrates an alternative embodiment of chip-to-chip optical interconnect 100 including alignments pins 180 disposed on waveguide 115 (or mechanical support 110) and alignment holes 185 disposed in landside 140 of substrate 120.

Mechanical support 110 provides rigidity and coupling strength to waveguide array 115 and may be fabricated of any rigid material, such as silicon, plastic, polymer, or the like. Mechanical support 110 mounts to waveguide mounting region 135 of socket 105. In the illustrated embodiment, waveguide mounting region 135 is a recess within socket 105. The recess within socket 105 may be of a size and shape to support waveguide array 115 flush with or slightly below the surface of socket 105 to allow substrate 120 to overlay a portion of waveguide array 115 when mated to socket 105.

In one embodiment, OTVs 150 may include an integrated lens or a lens disposed over one or both sides of OTVs 150 to focus light onto optical devices 170 or into waveguide array 115. In the illustrated embodiment, both sides of OTVs 150 include lens curvatures for focusing light propagating in either direction. Incorporation of the lenses alleviates alignment tolerances and increases optical power transfer between OE die 125 and waveguide array 115.

As mentioned, OTVs 150 are aligned with optical devices 170 of OE die 125, such that the center-to-center separation pitch of OTVs 150 substantially matches the pitch P between optical devices 170. For example, optical devices 170 may be integrated into OE die 125 with a pitch P approximately equal to 250 µm. The pitch P, in turn, constrains the size of the lens and OTVs 150. In one embodiment, the diameter of the lens and OTVs 150 are maximized based on the pitch P to relax alignment tolerances.

In one embodiment, all OTVs 150 are incorporated within a single physical unit, such that the single physical unit may be plugged into substrate 120 together (as opposed to separate insertion of each OTV 150). OTVs 150 may be fabricate of a variety of optically transmissive materials (e.g., silicone, polyimide, acrylic, benzocyclobutene ("BCB"), etc.) and using a variety of techniques (e.g., ink jet printing using polymer based materials, precision molding, laser machining, etc.). In one embodiment, an array of microlens is fabricated onto the surface of an optically transparent block, which block is then inserted into a similarly shaped cavity in substrate 120 as a single unit. Since OE die 125 is suspended above the surface of substrate 120 approximately 50 to 70 µm by electrical solder bump connections, the lens may protrude above the surface of substrate 120, as illustrated.

Waveguide array 115 may include a cladding material surrounding multiple optical cores to form each waveguide 175. The index of refraction of the core material and OTVs 150 may be matched to reduce interface reflections. To guide optical signals into and out of waveguide array 115, micromirrors may be formed into the end of each waveguide 175 directly beneath each OTV 150. In one embodiment, each individual mirror is a reflective plane cut into each waveguide 175 at a 45 degree angle relative to the plane of landside 140 of substrate 120. In one embodiment, the angled plane is coated with a reflective material, such as, silver or gold.

Figure 2A:
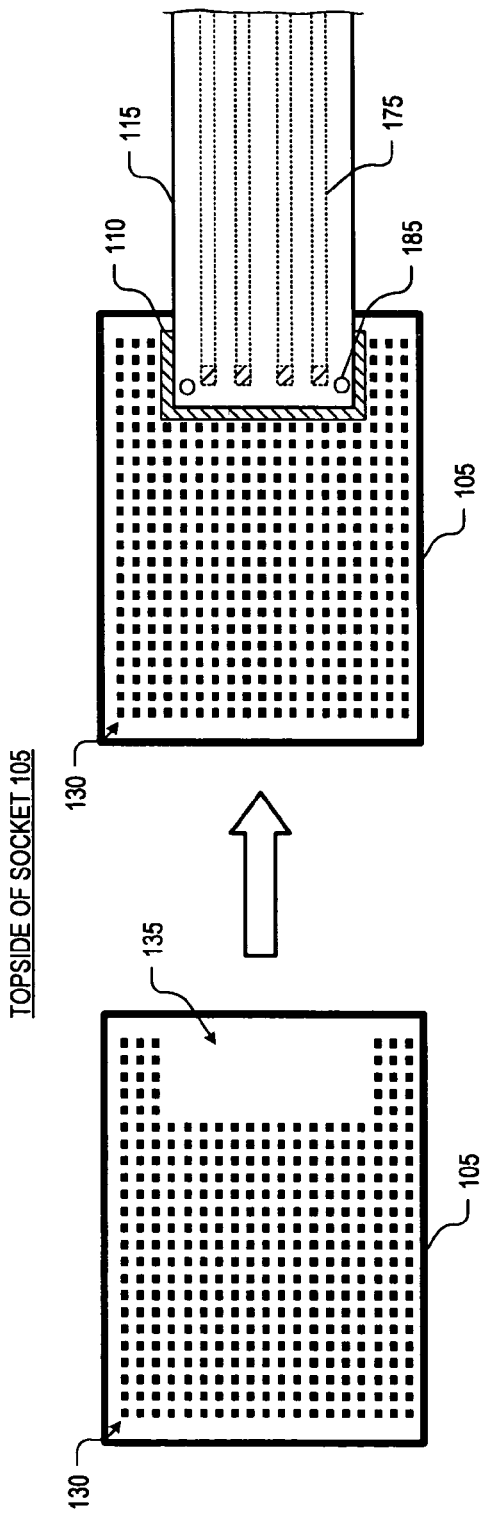
FIG. 2A is a plan view of a socket illustrating how a waveguide array of a chip-to-chip optical interconnect is coupled to the socket, in accordance with an embodiment of the invention.

FIG. 2A is a plan view of socket 105 illustrating how waveguide array 115 is coupled to socket 105, in accordance with an embodiment of the invention. As illustrated, mechanical support 110 seats into waveguide support region 135. In one embodiment, an adhesive may be used to fix mechanical support 110 to socket 105. In one embodiment, one or more fasteners, such as, alignment pins 180 themselves may be used to mount mechanical support 110 and waveguide array 115 to socket 105.

Figure 2B:
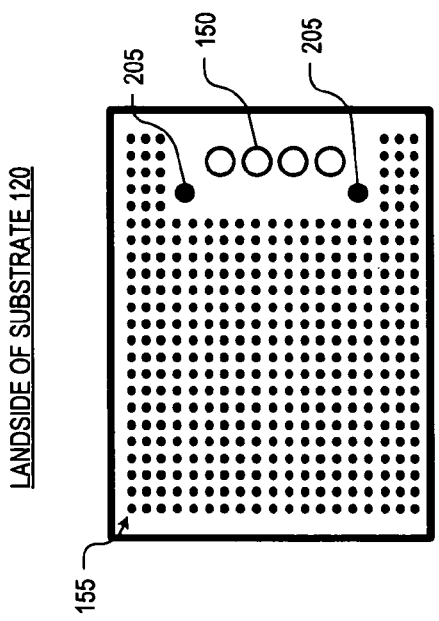
FIG. 2B is a plan view illustrating a landside of a substrate for mating to a socket to form electrical and optical connections, in accordance with an embodiment of the invention.

FIG. 2B is a plan view illustrating a landside 140 of substrate 120 for mating to socket 120 to form electrical and optical connections, in accordance with an embodiment of the invention. As illustrated, landside 140 of substrate 120 includes electrical terminal array 155 for electrically coupling IC 165 to remote circuit components. Landside 140 further includes OTVs 150 passing there through and alignment structures 205 (e.g., alignment pins 180 or alignment holes 185).

Figure 3:
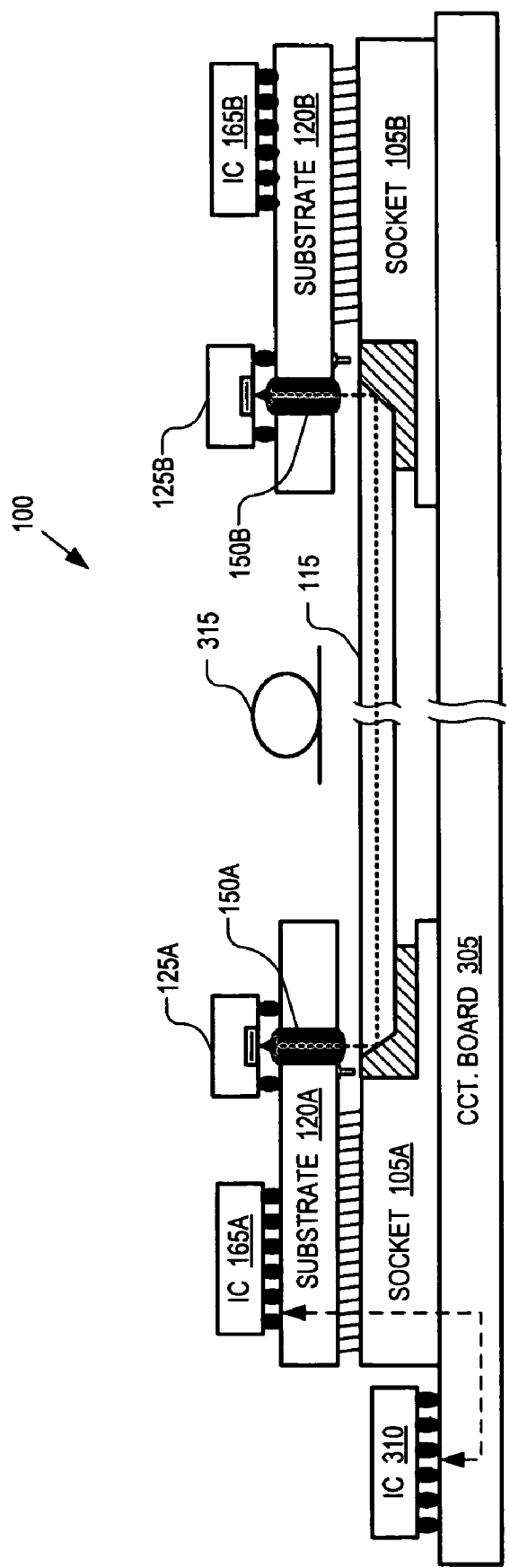
FIG. 3 is a side view illustrating optical communication between two chips via a chip-to-chip optical interconnect, in accordance with an embodiment of the invention.

FIG. 3 is a side view illustrating optical communication between two chips 165A and 165B via chip-to-chip optical interconnect 100, in accordance with an embodiment of the invention. Waveguide array 115 optically interconnects OE die 125A to OE die 125B. The optical connection may be unidirectional or bidirectional over one or multiple waveguides 175 embedded within waveguide array 115. In one embodiment, a first portion of the waveguides 175 are used for optical communications propagating from OE die 125A towards OE die 125B, while a second portion of the waveguides 175 are used for optical communications propagating from OE die 125B to OE die 125A. In yet another embodiment, waveguide array 115 may include a fiber bundle 315 interposed between the two ends of waveguide array 115 to provide flexible optical routing paths between OE dies 125A and 125B.

OE dies 125A and 125B convert the optical signals from the optical realm into the electrical realm (and vice versa) and then provide the converted electrical signals to ICs 165A and 165B, respectively. ICs 165A and 165B may include any electronic circuit, such as, drivers, buffers, logic elements, processing cores, and the like. Chip-to-chip optical interconnect 100 enables ICs 165A and 165B to communicate using a high bandwidth optical carrier. Sockets 105A and 105B may be located at remote locations on the same circuit board 305 (as illustrated) to provide intra-board chip-to-chip optical communications, or on different circuit boards to provide board-to-board optical communications.

In the illustrated embodiment, circuit board 305 further includes an IC 310 disposed on its surface and electrically coupled to IC 165A through socket 105A. In addition to communicating data signals to IC 165A, socket 105A also conducts power to IC 165A and OE die 125A. In an alternative embodiment, substrate 120A may not include IC 165A, but rather electrical output from OE die 125A may be directly coupled to IC 310 through electrical terminal array 130 of socket 105A. Although not illustrated, socket 105B may also be electrically coupled to other ICs disposed on circuit board 305 and both sockets 105A and 105B may be coupled to multiple such ICs.

Figure 4:
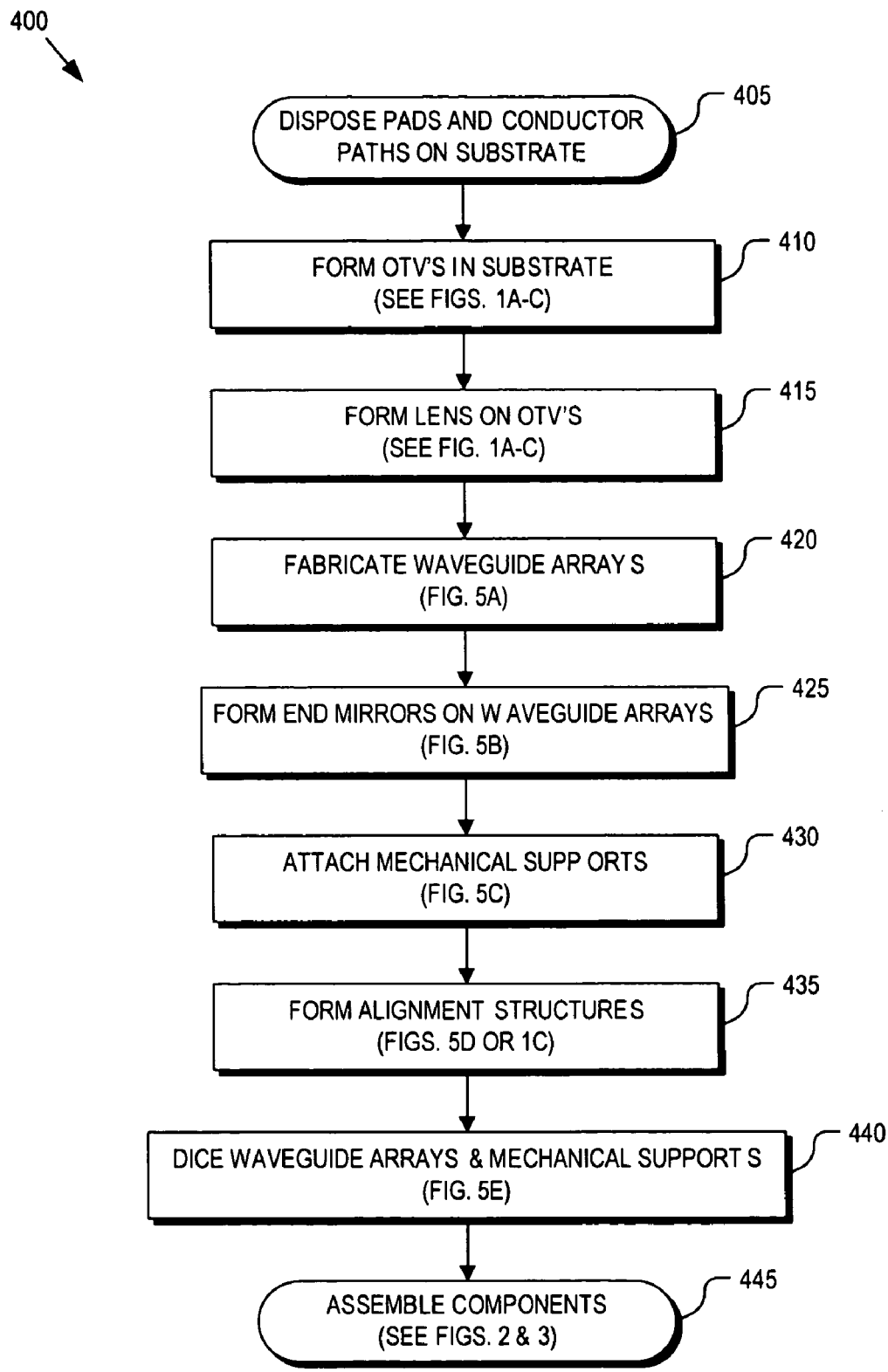
FIG. 4 is a flow chart illustrating fabrication of a chip-to-chip optical interconnect, in accordance with an embodiment of the invention.

FIG. 4 is a flow chart illustrating a fabrication process 400 of chip-to-chip optical interconnect 100, in accordance with an embodiment of the invention. Process 400 is described below with reference to FIGS. 5A-5E. The order in which some or all of the process blocks appear below should not be deemed limiting. Rather, one of ordinary skill in the art having the benefit of the present disclosure will understand that some of the process blocks may be executed in a variety of orders not illustrated.

In a process block 405, conductor pads and traces for electrically connecting IC 165 and OE die 125 are formed on chip side 145 of substrate 120. In a process block 410, OTVs 150 are formed through substrate 120. A variety of techniques may be used to form OTVs 150, including mechanical drilling/cutting, laser drilling, chemical etching, and otherwise. In process block 415, lenses are formed on one or both sides of OTVs 150. As mentioned above, a variety of techniques may be used to fabricate the lenses. In one embodiment, optically transmissive material is filled into the holes for OTVs 150 and planarized, then the lenses are subsequently deposited on the optically transmissive material using polymer inkjet techniques. The natural surface tension of the liquefied polymer material causes the liquefied polymer material to coalesce into a lens shape, and then harden via air drying or curing. Other embodiments may use precision molding or otherwise.

In a process block 420 (see FIG. 5A), a plurality of waveguide arrays 115 are formed as a single unit. Waveguide arrays 115 may be formed by forming a cladding material around a plurality of waveguide cores or by embedding the waveguide cores within the cladding material.

In a process block 425 (see FIG. 5B), end mirrors are formed on the distal ends of waveguides 175. In one embodiment, the end mirrors are formed by cutting oblique angles (e.g., 45 degrees) at the distal ends using laser ablation, cleaving, machining, or other approaches, and then coating the oblique angled surface with a reflective material (e.g., silver, gold, etc.).

In a process block 430 (see FIG. 5C), mechanical supports 110 are mounted to the distal ends of the waveguide arrays 115. As mentioned, mechanical supports 110 may be fixed with an adhesive (e.g., epoxy) or by mechanical fixture (e.g., screw, pin, clip, etc.).

In a process block 435 (see FIG. 5D), alignment structures 205 are formed on the waveguide arrays. In one embodiment, alignment structures 205 are simply holes (see FIG. 1B). In an alternative embodiment, the alignment structures 205 are pins (see FIG. 1C). In yet other embodiments, other passive alignment structures may be used.

Figure 5A:
FIG. 5A illustrates fabrication of waveguide arrays, in accordance with an embodiment of the invention.
Figure 5B:
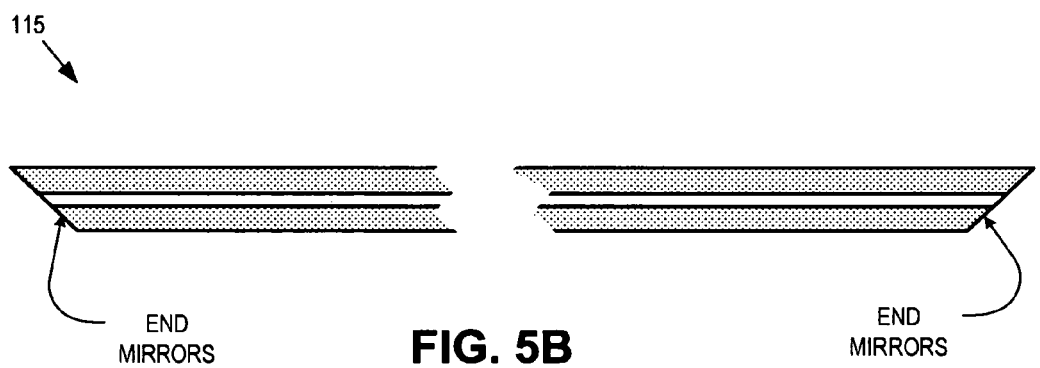
FIG. 5B illustrates forming end mirrors on the waveguide arrays, in accordance with an embodiment of the invention.
Figure 5C:
FIG. 5C illustrates attachment of mechanical supports to the waveguide arrays, in accordance with an embodiment of the invention.
Figure 5D:
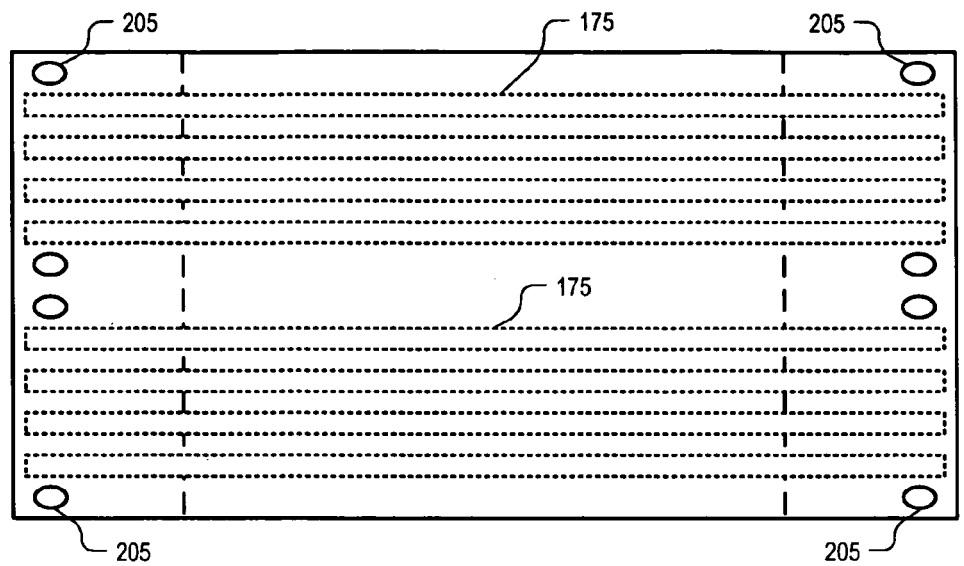
FIG. 5D illustrates forming alignment structures in the waveguide arrays, in accordance with an embodiment of the invention.
Figure 5E:
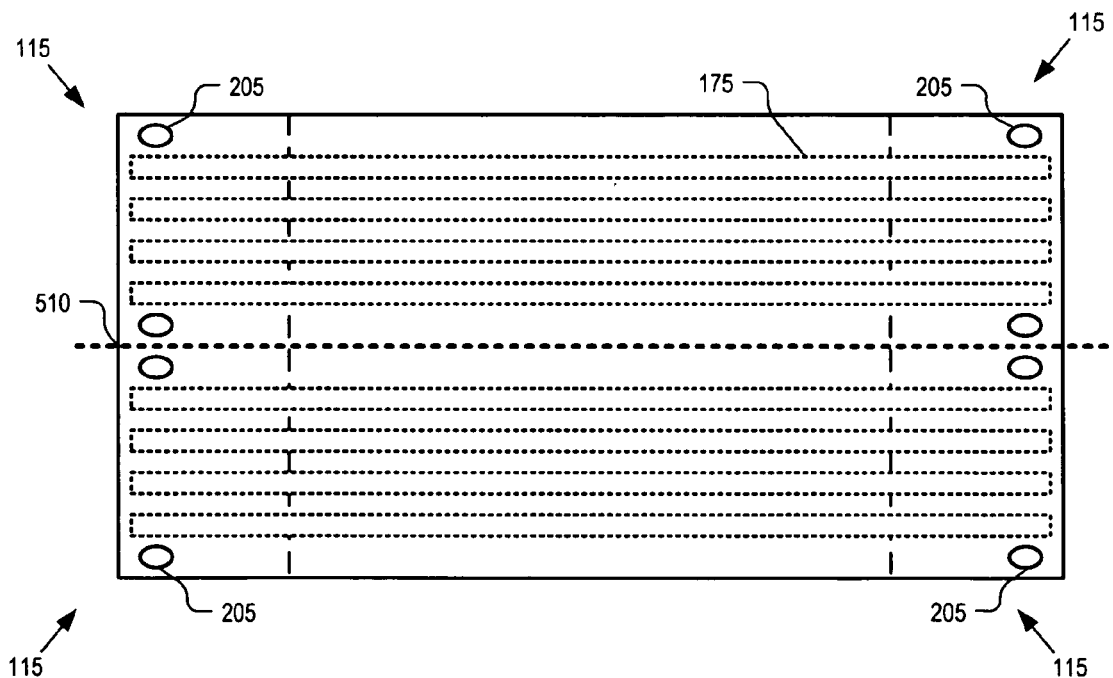
FIG. 5E illustrates dicing of the waveguide arrays into individual waveguide arrays with attached mechanical supports, in accordance with an embodiment of the invention.

In a process block 440 (see FIG. 5E), waveguide arrays 115 are diced along dicing line 510 into individual units. Although FIG. 5E illustrates two waveguide arrays 115 being fabricated at a time, it should be appreciated that more or less waveguide arrays 115 may be fabricated within a single unit at a time.

Finally, in a process block 445, the individual subcomponents are assembled to form chip-to-chip optical interconnect 100, as illustrated in FIG. 3. For example, socket 105 maybe soldered onto circuit board 305 and waveguide array 115 mounted thereto. Separately, OE die 125 and IC 165 may be picked and placed onto substrate 120 and subsequently soldered by reflow or other technique. Then, substrate 120 with OE die 125 and IC 165 disposed thereon, is mated as a unit to socket 105.

Figure 6:
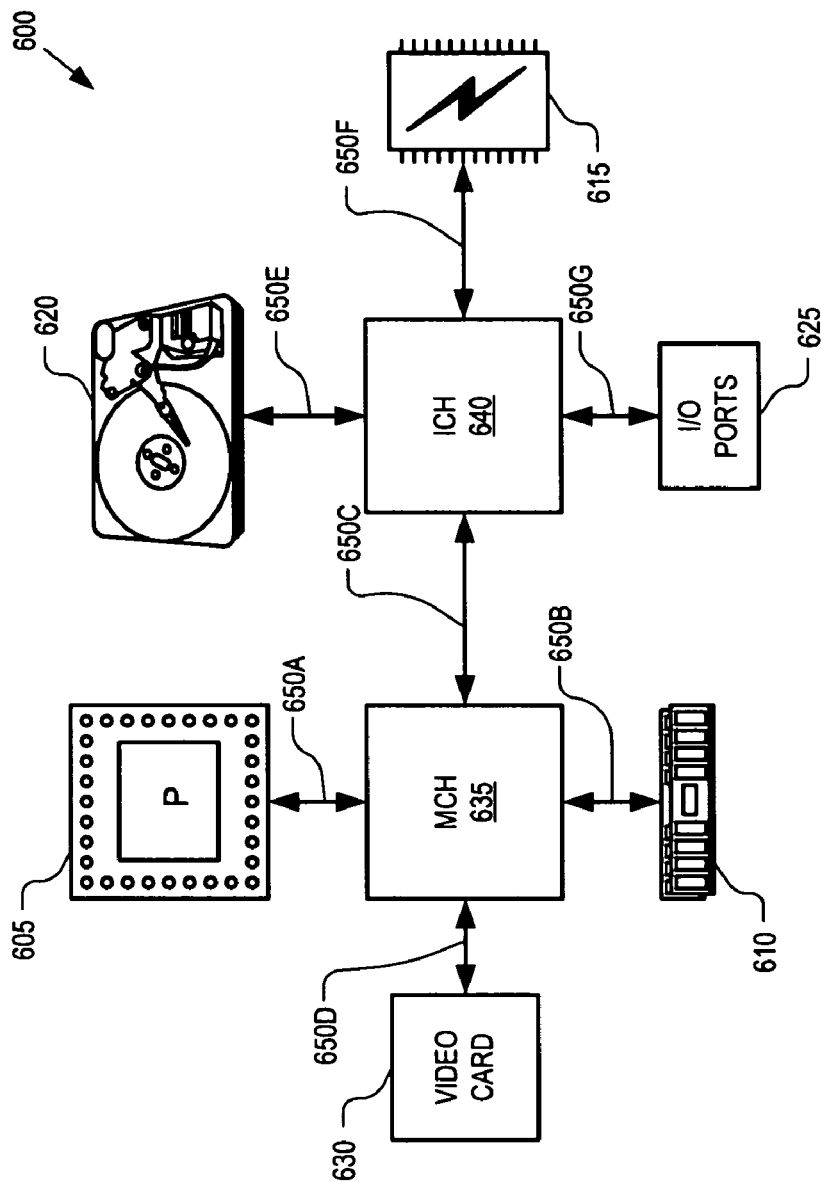
FIG. 6 is a demonstrative processing system implemented with one or more chip-to-chip optical interconnects, in accordance with an embodiment of the invention.

FIG. 6 illustrates a demonstrative processing system 600 implemented with one or more chip-to-chip optical interconnects 100, in accordance with an embodiment of the invention. The illustrated embodiment of processing system 600 includes one or more processors (or central processing units) 605, system memory 610, nonvolatile ("NV") memory 615, a data storage unit ("DSU") 620, input/output ("I/O") ports 625, a video card 630, and a chipset including a memory controller hub ("MCH") 635 and an I/O controller hub ("ICH") 640. The illustrated processing system 600 may represent any computing system including a desktop computer, a notebook computer, a workstation, a handheld computer, a server, a blade server, or the like.

The elements of processing system 600 are interconnected as follows. Processor(s) 605 is communicatively coupled to system memory 610, video card 630, and ICH 640 via MCH 635. Processor(s) 605 are coupled to NV memory 815, DSU 820, and I/O ports 625, via MCH 635 and ICH 640. In one embodiment, NV memory 615 is a flash memory device. In other embodiments, NV memory 615 includes any one of read only memory ("ROM"), programmable ROM, erasable programmable ROM, electrically erasable programmable ROM, or the like. In one embodiment, system memory 610 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 620 represents any storage device for software data, applications, and/or operating systems, but will most typically be a nonvolatile storage device. DSU 620 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. I/O ports 625 may couple processing system 600 to a network or a variety of peripheral devices. I/O ports 625 may includes Ethernet ports, Universal Serial Bus ("USB") ports, audio ports, a modem port, peripheral component interconnect ("PCI") ports, and the like.

Each of the subcomponents of processing system 600 are interconnected with communication links 650A-650G (collectively 650). Communication links 650 may be serial links or parallel links. Embodiments of chip-to-chip optical interconnect 100 may be used to implement one or more of communication links 650. Since chip-to-chip optical interconnect 100 is an optical communication channel, it is capable of high bandwidth throughput, is less susceptible to electromagnetic interference, and does not interfere with a heat sink. Since chip-to-chip optical interconnect 100 is passively aligned, an information technology ("IT") technician can simply plug both waveguide array 115 and substrate 120 with electronics disposed thereon into socket 105 in the field without aid of active alignment tools. For example, chip-to-chip optical interconnect 100 may be well suited for interconnecting processor(s) 605 with each other or interconnecting processor(s) 605 with MCH 635. Of course, chip-to-chip optical interconnect 100 may be used to interconnect any two IC's with each other whether the IC's are located on the same circuit board or on different circuit boards.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   a substrate including an optical via passing through the substrate;
   an optoelectronic die disposed on the substrate, the optoelectronic die aligned to optically communicate through the optical via;
   a waveguide structure positioned proximate to the substrate and aligned with the optical via to communicate optical signals with the optoelectronic die through the optical via; and
   a socket including a first electrical terminal array and a waveguide mounting region,
   wherein the substrate includes a second electrical terminal array configured to electrically interconnect with the first electrical terminal array when the substrate is mated with the socket, and
   wherein the waveguide structure mounts to the waveguide mounting region of the socket.

2. The apparatus of claim 1, further comprising:
   a mechanical support to support the waveguide structure, wherein the waveguide mounting region of the socket comprises a recess in the socket to accept the mechanical support, and
   wherein the mechanical support is mounted into the recess.

3. The apparatus of claim 1, further comprising:
   at least one alignment hole disposed in at least one of the mechanical support or the waveguide structure; and
   at least one alignment pin disposed on the substrate, wherein the at least one alignment pin mates with the alignment holes to optically align the waveguide structure with the optical via when the substrate is mated with the socket.

4. The apparatus of claim 1, further comprising:
   at least one alignment hole disposed in the substrate; and
   at least one alignment pin disposed on at least one of the waveguide structure or the mechanical support, wherein the alignment pin mate with the alignment hole to optically align the waveguide structure with the optical via when the substrate is mated with the socket.

5. The apparatus of claim 1, wherein the waveguide structure comprises a plurality of waveguides, the apparatus further comprising:
   a plurality of optical vias passing through the substrate, wherein each one of the plurality of waveguides is optically aligned with one of the plurality of optical vias.

6. The apparatus of claim 1, further comprising an integrated circuit disposed on the substrate and electrically connected to the optoelectronic die and electrically connected to the second electrical terminal array.

7. The apparatus of claim 6, wherein the integrated circuit is electrically connected to the optoelectronic die along conductor traces disposed on a surface of the substrate, and wherein the integrated circuit is electrically connected to the second electrical terminal array by a plurality of electrical vias passing through the substrate.

8. The apparatus of claim 6, wherein the integrated circuit comprises a first integrated circuit, the apparatus further comprising:
   a circuit board, wherein the socket is disposed on the circuit board; and
   a second integrated circuit disposed on the circuit board, wherein first and second integrated circuits are electrically interconnected through the socket.

9. The apparatus of claim 8, wherein the socket comprises a first socket, the substrate comprises a first substrate, the optoelectronic die comprises a first optoelectronic die, and the optical via comprises a first optical via, wherein the apparatus further comprises:
   a second socket disposed on the circuit board;
   a second substrate including a second optical via passing through the second substrate, the second substrate mated to the second socket, wherein the waveguide structure is mounted at a first end to the first socket and at a second end to the second socket; and
   a second optoelectronic die disposed on the second substrate and optically aligned with the waveguide structure through the second optical via, wherein the first and second optoelectronic dice are coupled to optically communicate through the waveguide structure.

10. The apparatus of claim 1, further comprising a lens disposed to focus the optical signals communicated through the optical via.

11. The apparatus of claim 1, wherein the waveguide structure includes a mirror angled to reflect the optical signals received from the optical via into the waveguide structure or to reflect the optical signals received from the waveguide structure into the optical via.

12. A method, comprising:
   receiving an optical signal from a waveguide at a first side of a substrate disposed proximate to the waveguide;

passing the optical signal from the first side of the substrate through an optical via to a second side of the substrate;

coupling the optical signal into an optoelectronic die disposed on the second side of the substrate and aligned with the optical via;

converting the optical signal to an electrical signal within the optoelectronic die;

coupling the electrical signal to an integrated circuit disposed on the second side of the substrate; and coupling a second electrical signal into at least one electrical terminal of an array of electrical terminals within a socket on which the substrate is mounted.

13. The method of claim 12, further comprising:

coupling the second electrical signal through at least one electrical via passing from the first side of the substrate to the second side of the substrate; and coupling the second electrical signal from the at least one electrical via into the integrated circuit.

14. The method of claim 13, further comprising:

propagating the optical signal along the waveguide;

reflecting the optical signal from a first end of the waveguide into the optical via; and focusing the optical signal after reflecting the optical signal and prior to coupling the optical signal into the optoelectronic die.

15. The method of claim 14, further comprising mechanically supporting the first end of the waveguide within a recess on the socket, wherein the substrate overlays a portion of the waveguide when mated with the socket.

16. A system, comprising:

a socket;

a substrate mated to the socket on a first side and including an optical via passing through the substrate;

an optoelectronic die disposed on a second side of the substrate, the optoelectronic die aligned to optically communicate through the optical via;

a waveguide structure positioned proximate to the substrate and aligned with the optical via on the first side of the substrate to communicate optical signals with the optoelectronic die through the optical via;

an integrated circuit disposed on the second side of the substrate; and synchronous dynamic random access memory ("SDRAM") electrically coupled to the integrated circuit via the socket.

17. The system of claim 16, wherein the socket includes a first electrical terminal array and a waveguide mounting region, wherein the substrate includes a second electrical terminal array configured to electrically interconnect with the first electrical terminal array when the substrate in mated with the socket, and wherein the waveguide structure mounts to the waveguide mounting region of the socket.

18. The system of claim 17, further comprising:

a mechanical support to support the waveguide structure, wherein the waveguide mounting region of the socket comprises a recess in the socket to accept the mechanical support, and wherein the mechanical support is mounted into the recess.

19. The system of claim 18, further comprising:

a first alignment structure disposed on at least one of the mechanical support or the waveguide structure; and a second alignment structure disposed on the first side of the substrate, wherein the first and second alignment structures mate to optically align the waveguide structure with the optical via when the substrate is mated with the socket.

* * * * *